US011834282B1

(12) United States Patent
Cuellar et al.

(10) Patent No.: US 11,834,282 B1
(45) Date of Patent: Dec. 5, 2023

(54) TROLLEY SYSTEM, APPARATUS AND METHOD

(71) Applicant: Stolt-Nielsen USA Inc., Houston, TX (US)

(72) Inventors: Julio Cuellar, Houston, TX (US); Dan Shelton, Houston, TX (US)

(73) Assignee: Stolt-Nielsen USA Inc., Houston, TX (US)

( * ) Notice: Subject to any disclaimer, the term of this patent is extended or adjusted under 35 U.S.C. 154(b) by 0 days.

(21) Appl. No.: 17/943,010

(22) Filed: Sep. 12, 2022

(51) Int. Cl.
*B65G 63/00* (2006.01)
*B65G 65/00* (2006.01)

(52) U.S. Cl.
CPC ......... *B65G 63/004* (2013.01); *B65G 65/005* (2013.01); *B65G 2203/0258* (2013.01); *B65G 2203/042* (2013.01)

(58) Field of Classification Search
CPC .. B65G 63/004; B65G 63/025; B65G 63/045; B65G 65/005; B65G 65/02; B65G 2203/042; B61B 1/005; B23G 7/1431
USPC .......................................................... 269/56
See application file for complete search history.

(56) References Cited

U.S. PATENT DOCUMENTS

| 2002/0060127 | A1* | 5/2002 | Okuyama | B23Q 11/00 198/346.2 |
| 2003/0072642 | A1* | 4/2003 | Evans | B23Q 7/1431 414/539 |
| 2014/0070473 | A1* | 3/2014 | Ho | B23Q 7/1431 29/559 |
| 2016/0178127 | A1* | 6/2016 | Oh | B60S 5/02 141/98 |

FOREIGN PATENT DOCUMENTS

FR      2944267 A1 * 10/2010 ........... B65G 63/045

* cited by examiner

*Primary Examiner* — Kaitlin S Joerger
(74) *Attorney, Agent, or Firm* — Hunton Andrews Kurth LLP

(57) ABSTRACT

An example embodiment of the system, device and method of the present disclosure can provide for moving containers in and out of a service bay using a mechanized platform or trolley. In one example, a station can include a service bay and two lifting bays on opposite sides of the service bay. In one example, a trolley can ride on the tracks between the lifting bays. The trolley can hold two containers positioned side-by-side. In one example, a technician can work on a container placed under the service bay. At the same time, another container placed on the trolley in the lifting bay can be hauled away using a lift truck. The technician can instruct the trolley to move away the container under the service bay and replace it with another container located on the trolley.

14 Claims, 12 Drawing Sheets

TROLLEY SYSTEM, APPARATUS AND METHOD

BACKGROUND

An intermodal container (also known as a shipping container, a cargo container, a freight container, an ISO or non-ISO container, and/or other container or other object to hold and/or transport something in need of being held or transported) is a large standardized shipping box or container, designed and built for intermodal freight transport. This means that these containers can be used across different modes of transport, e.g., from ship to rail to truck, without unloading and reloading their cargo. Intermodal containers are primarily used to store and transport materials and products efficiently and securely in, e.g., the global containerized intermodal freight transport system.

Intermodal containers exist in many types and a number of standardized sizes. There are broadly 6 types of intermodal containers: Dry Freight, Insulated, Open-top, Flat Rack, Refrigerated, and Tank. The most common, general-purpose containers, carry all types of cargo without any particular specifications. Most of the global container fleet are "dry freight" or "general purpose" containers. These containers are durable, closed rectangular boxes, made of rust-retardant Corten steel; almost all 8 feet (2.44 m) wide, and of either 20 or 40 feet (6.10 or 12.19 m) standard length. The worldwide standard heights are 8 feet 6 inches (2.59 m) and 9 feet 6 inches (2.90 m).

SUMMARY

Containers, e.g., intermodal shipping containers or ISO containers, can be used for transporting materials and products in the global containerized freight transport system. Once a container has been emptied of its cargo, the next destination can, e.g., be a container depot. In some examples, container depots provide one or more services such as, e.g., storage, inspection, cleaning, and/or repairs to maintain the container and prepare it for another transit.

In some examples, the infrastructure within a container depot can include workshop stations, cleaning stations, and/or other stations (hereinafter "stations" or "station systems"). Each station can perform one or more services on an incoming container, e.g., fix the container or clean it. In one example, a station can house one or more service bays, e.g., a location at which a container may be staged, loaded, offloaded, cleaned, or some other service performed. A container can be moved under or near a service bay and the technicians can, e.g., clean, fix or service the container.

Most containers are heavy, and in order to move containers within a container depot heavy equipment can be used. An example of the heavy equipment can be a lift truck or a fork lift. In some exemplary container depots, the lift truck(s) can be in high demand, sometimes moving non-stop in support of operational activities. Also, these lift trucks can break down, or there may not be enough operators to operate them. In other words, there can be a relative shortage of lift trucks and/or drivers who operate these lift trucks.

In these exemplary container depots, there can be times when the service bays fix, clean and/or service containers at a rate faster than the rate at which these service bays receive containers from the lift trucks (because, e.g., lift trucks are in demand and heavily used for various operations, lift trucks break down, or there are no drivers to operate these trucks). In these circumstances, the productivity of an individual service bay can be dependent on the time it takes to haul away a serviced container from the service bay and place another container within the service bay. As such, in these examples, the slow rate of changing out one container for the next can negatively impact the efficiency of the service bays.

An example embodiment of the system, device, apparatus and method of the present disclosure can relate to moving containers in and out of a service bay using a mechanized platform or trolley. By trolley is meant any mechanism capable of being configured to receive, transfer, or otherwise carry a container of some type. In one example, a station can include a service bay and two lifting bays on opposite sides of the service bay. For example, there can be a lifting bay, a service bay, and another lifting bay. A trolley can run on tracks (or rails) in between the lifting bays. By tracks or rails is meant any structure or other mechanism configured to guide or steer or otherwise assist in transferring or moving a trolley. In one example, the trolley can connect the lifting bays by passing through the service bay.

In one example, the trolley can hold two containers positioned side-by-side. In one example, the trolley can ride on the tracks between the lifting bays. In one example, the movement can be transverse or sideways relative to the longitudinal axis of one or more of the containers. Alternatively, the movement may be up or down relative to the other axis of one or more of the containers. In one example, the track length can be about three service bays. Other lengths for the tracks are also possible. In one example, the trolley width can be about two of the service bays. In one example, when the trolley is parked at either end stop (i.e., lifting bay), one container can be in the service bay and the adjacent container can be accessible to the lift truck in the lifting bay. In one example, a trolley can include a motor for sliding the trolley on the tracks. The motor can be in communication with a control unit using a transceiver. The trolley can also optionally include a processor and a memory for receiving instructions from the control unit. In one example, the trolley can receive wireless communications from the control unit.

In one example, a technician can remove a serviced container and replace it with a new container in a single action. For example, the technician can quickly and safely move a serviced container from the service bay to a lifting bay by instructing the trolley to move. By moving the serviced container, another container can come into the service bay when the trolley moves. The lifting bays can provide lift truck access to the trolley for taking out a serviced container and replacing it with another container in queue.

In one example, the exemplary embodiments of the present disclosure can eliminate the down time of the service bays during the change out operation. This exemplary enhanced efficiency can potentially increase the productivity of the service bays by 100%. Additionally, the exemplary embodiments of the present disclosure can provide flexibility and strain relief for the lift trucks in a container depot and other container related operations. Furthermore, the exemplary embodiments of the present disclosure can provide operational efficiency because, in some embodiments, the service equipment can be permanently placed in the service bay. This can eliminate interference with the container and lift truck movement.

In one example, some containers, e.g., liquid tank containers, may require rear end and top side access for performing certain services, e.g., inspection, cleaning, and repair. The exemplary embodiments of the present disclosure can provide a fixed walkway structure to span over the top of the container. This exemplary structure can be engineered as fall prevention. This exemplary design can be in contrast to the less desirable and higher risk systems, which implement fall protection. For example, in some embodiments the present systems and methods may be implemented with topside and/or rear access with, for example, handrails and the like. These and other fall protection mechanisms may be preferable to other systems and methods that attempt to instead minimize injury using, for example, helmets, nets, and similar protection mechanisms.

In some exemplary embodiments, the techniques described herein relate to a system, apparatus and method including: a station including a service bay, a first lifting bay, and a second lifting bay; a set of tracks connecting the first lifting bay to the service bay and the second lifting bay; a trolley configured to slide on the set of tracks and receive a first container and a second container; and a control unit for activating a motor of the trolley; wherein in a first mode of operation, the trolley is configured to be in the service bay and the first lifting bay, and in a second mode of operation, the trolley is configured to be in the service bay and the second lifting bay.

In some aspects, the techniques described herein relate to a system, wherein the service bay includes a stationary platform.

In some aspects, the techniques described herein relate to a system, wherein in the first mode of operation, the first container is under the service bay, and in the second mode of operation, the second container is under the service bay.

In some aspects, the techniques described herein relate to a system, wherein in the first mode of operation, the first container is accessible through the stationary platform, and in the second mode of operation, the second container accessible through the stationary platform.

In some aspects, the techniques described herein relate to a system, wherein the service bay includes an access ramp.

In some aspects, the techniques described herein relate to a system, wherein the service bay includes a roof.

In some aspects, the techniques described herein relate to a system, wherein a side of the trolley is about twice a width of the service bay.

In some aspects, the techniques described herein relate to a system, wherein a length of the set of tracks is about three times a width of the service bay.

In some aspects, the techniques described herein relate to a system, wherein the control unit is configured to receive data from a sensor, and activate the motor for the trolley using the data.

In some aspects, the techniques described herein relate to a system, wherein the control unit is configured to run a machine learning model.

In some aspects, the techniques described herein relate to a system, wherein the machine learning model is trained using data including past performance of a technician.

In some aspects, the techniques described herein relate to a system, wherein the machine learning model is configured to predict when a service being performed on at least one of the first container and the second container is going to conclude.

In some aspects, the techniques described herein relate to a system, wherein the machine learning model is configured to contact a lift truck for delivering a container to the trolley.

In some aspects, the techniques described herein relate to a system, wherein the machine learning model is configured to contact a lift truck for removing at least one of a first container and the second container from the trolley.

In some aspects, the techniques described herein relate to a system, wherein at least one of the first container and the second container is an intermodal container.

In some aspects, the techniques described herein relate to a system, wherein at least one of the first container and the second container is a tank.

In some aspects, the techniques described herein relate to a system, wherein a lift truck is configured to place or remove at least one of the first container and the second container on the trolley.

While certain embodiments of the present disclosure are described in connection with a container bay, one of ordinary skill in the art recognizes that the scope of the present disclosure is not limited to container depots. One of ordinary skill in the art also recognizes that in some embodiments, moving apparatuses other than trolleys can be used to move containers between the lifting bays.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional features and advantages will be set forth in the Detailed Description and/or appended Claims, and in part will be obvious from the Detailed Description, appended Claims, or may be learned by the practice of the teachings herein. Features and advantages of the disclosure may be realized and obtained by means of the instruments and combinations particularly pointed out in the Detailed Description and/or appended Claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Exemplary embodiments of the disclosure will now be described in order to illustrate various features of the disclosure. The embodiments described herein are not intended to be limiting as to the scope of the disclosure, but rather are intended to provide examples of the components, use, and operation of the disclosure.

Figure 1:
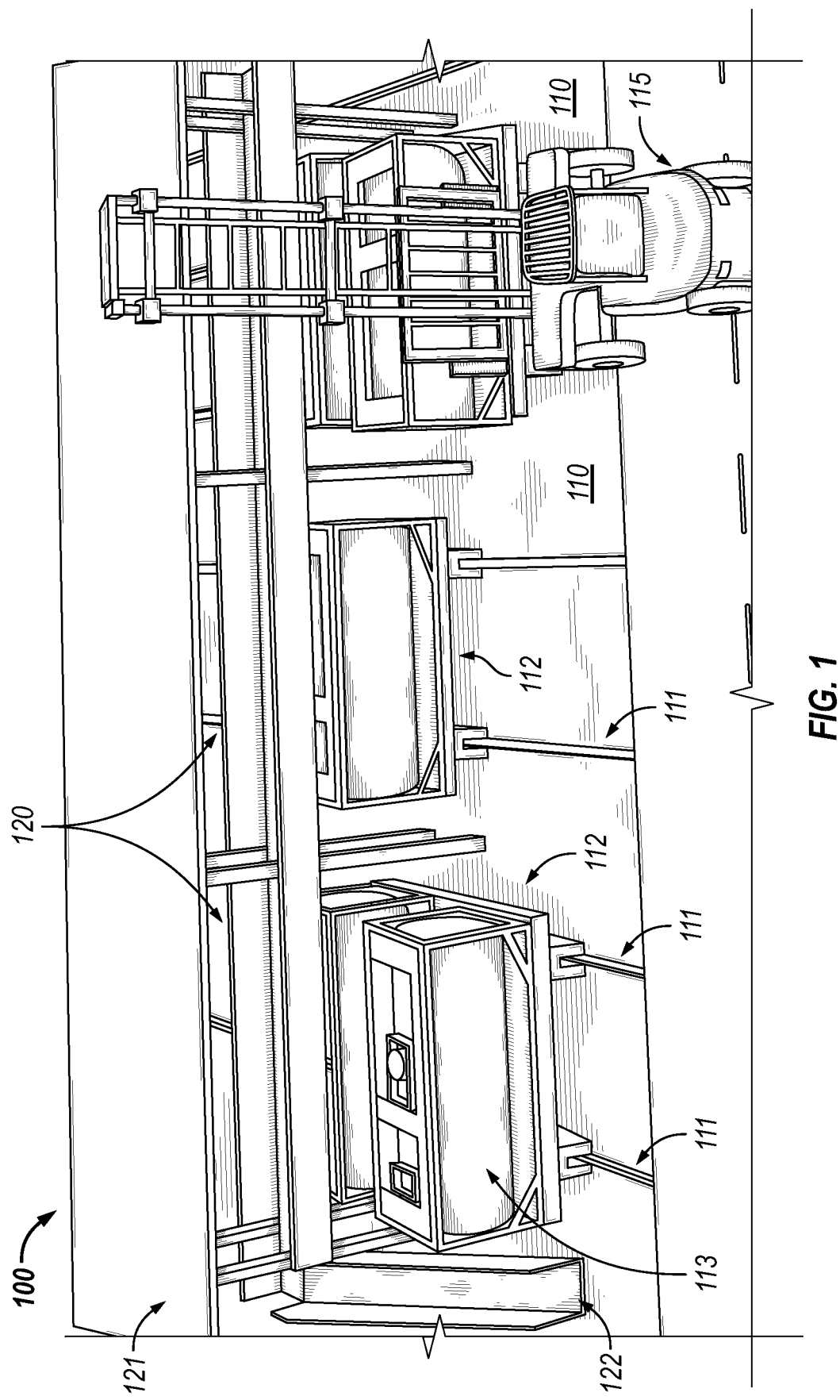
FIG. 1 shows a front view of an exemplary station system according to an exemplary embodiment of the present disclosure.

FIG. 1 shows a front view of an exemplary station system 100 according to an exemplary embodiment of the present disclosure. The exemplary station system 100 can include one or more bays. In this example, the illustrated exemplary station system 100 can include three bays, e.g., (a), (b) and (c). In this example, a bay can include two lifting bays 110, and a service bay 120. As such, the station system 100 can include service bays 120(a), 120(b), and 130(c). Similarly, the station system 100 can include lifting bays 110(a), 110(b), and 110(c). In one example, the front of the station system 100 can include a set of lifting bays, e.g., 110(a)(1), 110(b)(1), and 110(c)(1), and the back of the station system 100 can include another set of lifting bays, e.g., 110(a)(2), 110(b)(2), and 110(c)(2). See, e.g., FIGS. 2-6.

In one example, a bay in the station system 100 can include a trolley 112 and tracks 111 for the trolley 112. The trolley 112 can hold a container 113 and/or 114. The tracks 111 can extend between the lifting bays. For example, the tracks 111 can start at a lifting bay, e.g., 110(a)(1), in the front of the station system 100, pass through the service bay, e.g., 120(a), and continue to the lifting bay, e.g., 110(a)(2), in the back of the station system 100. In the example embodiment of FIG. 1, there can be three trolleys, 112(a), 112(b), and 112(c). In one example, a lift truck 115 can place a container, e.g., 113 or 114, on the trolley 112. Similarly, the lift truck 115 can remove the container from the trolley 112.

In one example, the station system 100 can include a roof 121 for covering the service bays 120. Additionally, the station system 100 can include an access ramp 122 for the technicians to access the service bays 120. The station system 100 can further include a stationary platform 123 on which a technician can work and access a container placed underneath the service bay 120.

In one example, the station system 100 can include a control unit. The control unit can, e.g., transmit signals to one or more trolleys 112, e.g., to instruct the trolleys to move from one position to another position. Additionally, the control unit can receive instructions from the technicians, e.g., to move a particular trolley 112. In one example, the control unit can receive sensor data and provide instructions to the trolleys 112 based on the sensor data. The sensor data can include, e.g., closing the doors of the container, receiving no more liquid waste from the container, exceeding a threshold time for the container at the service bay, closing of a water pipe for washing the container, etc.

In one example, the control unit can predict the operational performance of a particular bay (or service bay) and provide instructions to the operator of the lift truck 115 to, e.g., prioritize replacing the container at the particular bay (or service bay). For example, the control unit can predict that service bay (a) will finish its service in 10 minutes, but service bay (b) will finish its service in 20 minutes. The control unit, in this example, can provide an instruction to the operator of the lift truck to replace the container at service bay (a) before service bay (b). This prediction can be based on, e.g., the type or service required to be performed on the container in service bays (a) and (b), past performance of the technician working on each bay, the size of the container in each bay, the type of container in each bay, etc.

In one example, a trolley 112 can move between a front lifting bay and a back lifting bay. The size of the trolley can be twice as large as the width of the service bay 120. In an exemplary embodiment, in one mode of operation, a part of the trolley 112(a) can be in the front lifting bay 110(a)(1) and the rest of the trolley 112(a) can be in the service bay 120(a). In an exemplary embodiment, in a second mode of operation, a part of the trolley 112(a) can be in the back lifting bay 110(a)(2) and the rest of the trolley 112(a) can be in the service bay 120(a). One of ordinary skill in the art recognizes that a trolley 112 can operate in many modes of operation.

In one example, due to the size of the trolley 112, i.e., about twice the width of the service bay 120, and the size of the tracks 111, i.e., about three times the width of the service bay 120, a portion of the trolley 112 always remains in the service area, and a portion of the trolley 112 remain either in the front lifting bay 110(a)(1) or the back lifting bay 110(a)(2). As such, while the trolley 112 moves between the first mode of operation and the second mode of operation, at least one of the containers 113 and 114 (placed on the trolley 112) remains accessible to the service bay 120. FIG. 1 shows an example embodiment in which the container 113 is in the lifting bay 110(a)(1) and the container 114 is in the service bay 120(a).

Figure 2:
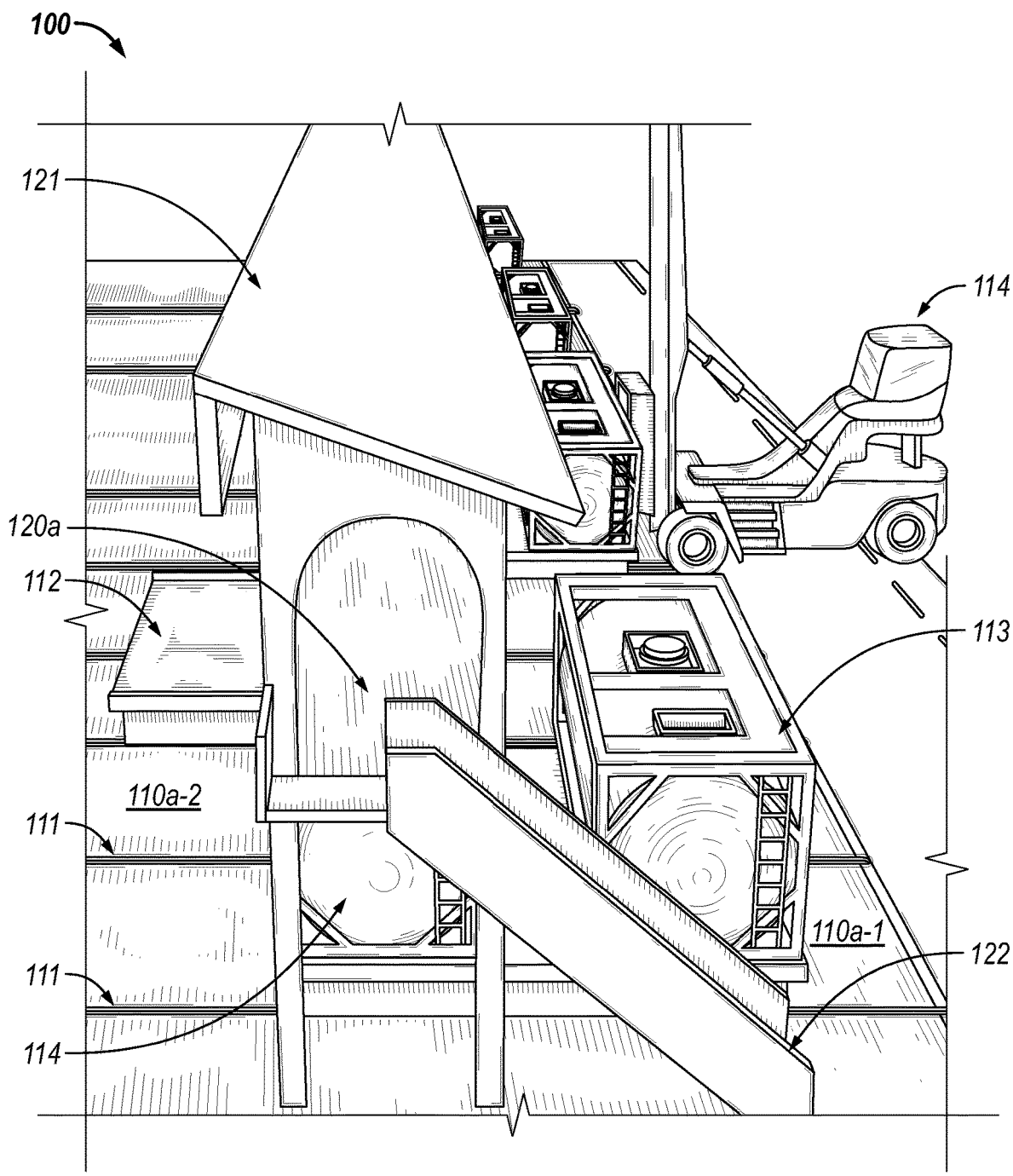
FIG. 2 shows a side view of the station system according to an exemplary embodiment of the present disclosure.

FIG. 2 shows a side view of the station system 100 according to an exemplary embodiment of the present disclosure. In this example embodiment, the container 113 is in the lifting bay 110(a)(1) and the container 114 is in the service bay 120(a). A technician can access the service bay 120(a) using the access ramp 122 and clean or fix the container 114 while it is under the service bay 120(a). In this example, a portion of the trolley 112(a) is in the lifting bay 110(a)(1) and another portion of the trolley 112(a) is in the service bay 120(a). The trolley 112(a) is not in the lifting bay 110(a)(2). In this example, if the technician has already serviced the container 113, the container 113 can be lifted using the lift truck 115. On the other hand, if the technician has not finished the service for the container 114, the technician can instruct the control unit to move the trolley 112(a) to access the container 113 once the service for container 114 is finished. As such, the technician does not need to wait to receive a new container from a lift truck when the service for container 114 is finished.

Figure 3:
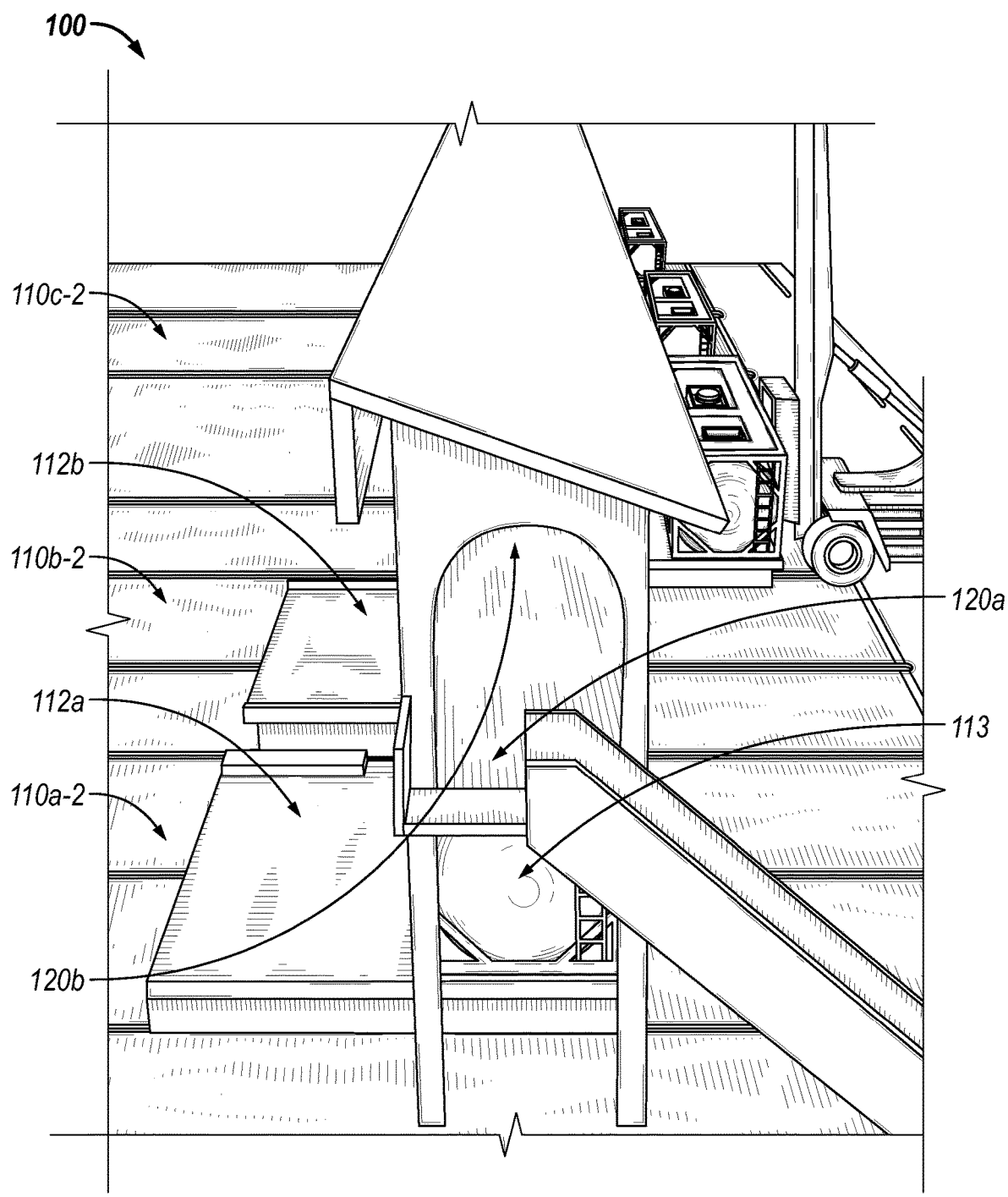
FIG. 3 shows a perspective back view of the station system according to an exemplary embodiment of the present disclosure.

FIG. 3 shows a perspective back view of the station system 100 according to an exemplary embodiment of the present disclosure. In this example, a portion of trolleys 112(a) and 112(b) are in the lifting bays 110(a)(2) and 110(b)(2), respectively. In other words, trolleys 110(a)(2) and 110(b)(2) are in the second mode of operation. The trolley 112(c) is not in the lifting bay 110(c)(2), i.e., it is in the first mode of operation. Each of the service bays 120(a), 120(b), and 120(c) includes a container, e.g., container 113. Technicians can service the containers when they are in the service bays. Each of the trolleys 112(a) and 112(b) can receive a container, e.g., when the control unit sends a communication to the operator of the lift truck 115.

Figure 4:
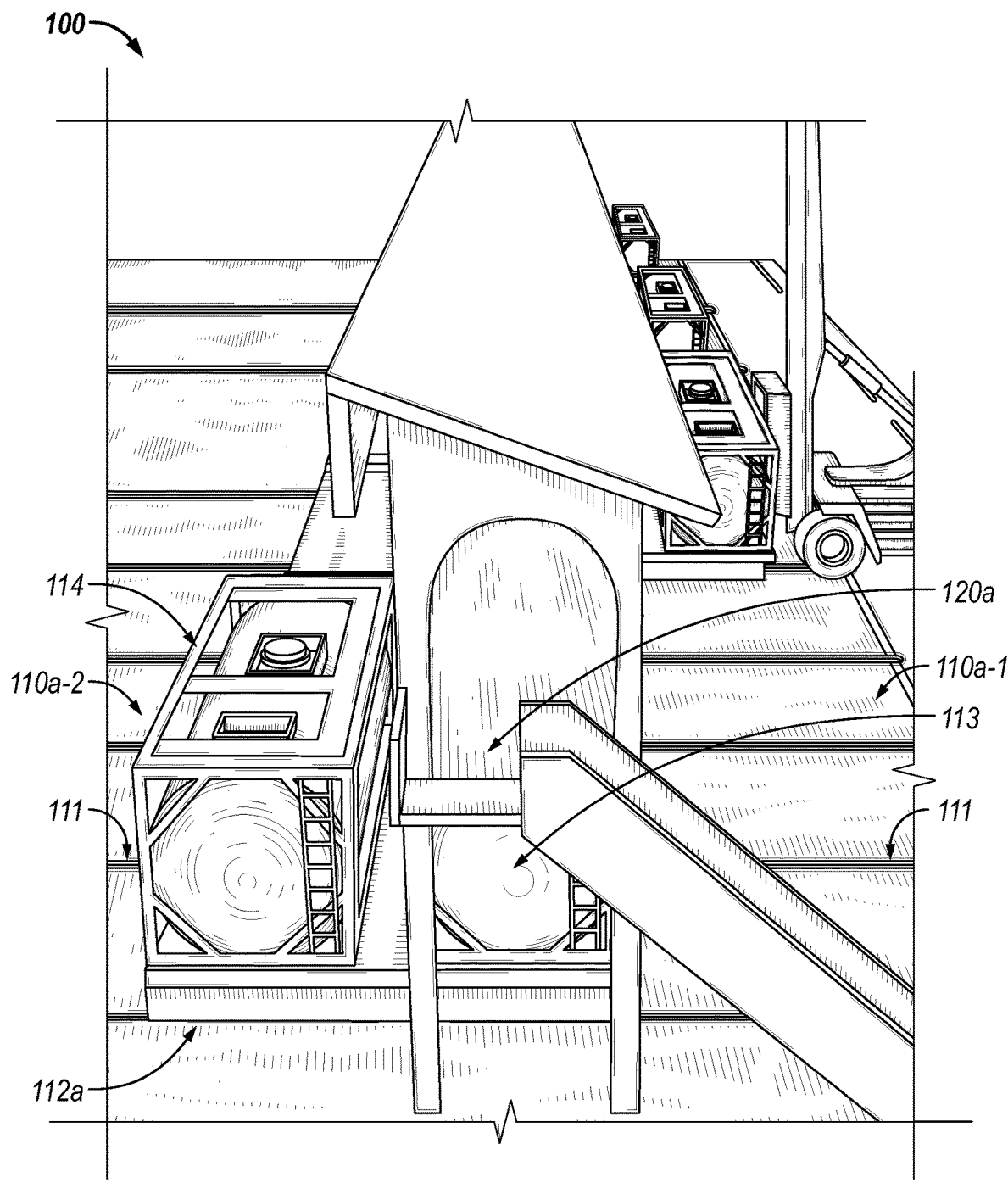
FIG. 4 shows another perspective back view of the station system according to an exemplary embodiment of the present disclosure.

FIG. 4 shows another perspective back view of the station system 100 according to an exemplary embodiment of the present disclosure. In this example embodiment, a lift truck 115 has placed the 114 container on the trolley 112(a). Therefore, the technician working on the service bay 120(a) can utilize the control unit to instruct the trolley 112(a) to haul away the container 113 once the service on the container 113 is concluded. Once the container 113 is hauled away (i.e., the trolley is moved to the first mode of operation), the technician can work on the container 114. In this example, the technician can immediately work on the container 114 once the container 113 is hauled away from the service bay 120(a). In this example, the station system 100 can provide access, to the technician, to the top and sides of the container 113 (and same for container 114 when container 114 is moved to the service bay 120(a)). Moreover, in this example embodiment, the service equipment can be placed in the service bay 120(a), i.e., the service equipment is stationary, e.g., there is no need to move the equipment. This exemplary configuration can minimize any likelihood of interference of the service equipment with the lift truck 115 and the trolley 112(a).

Figure 5:
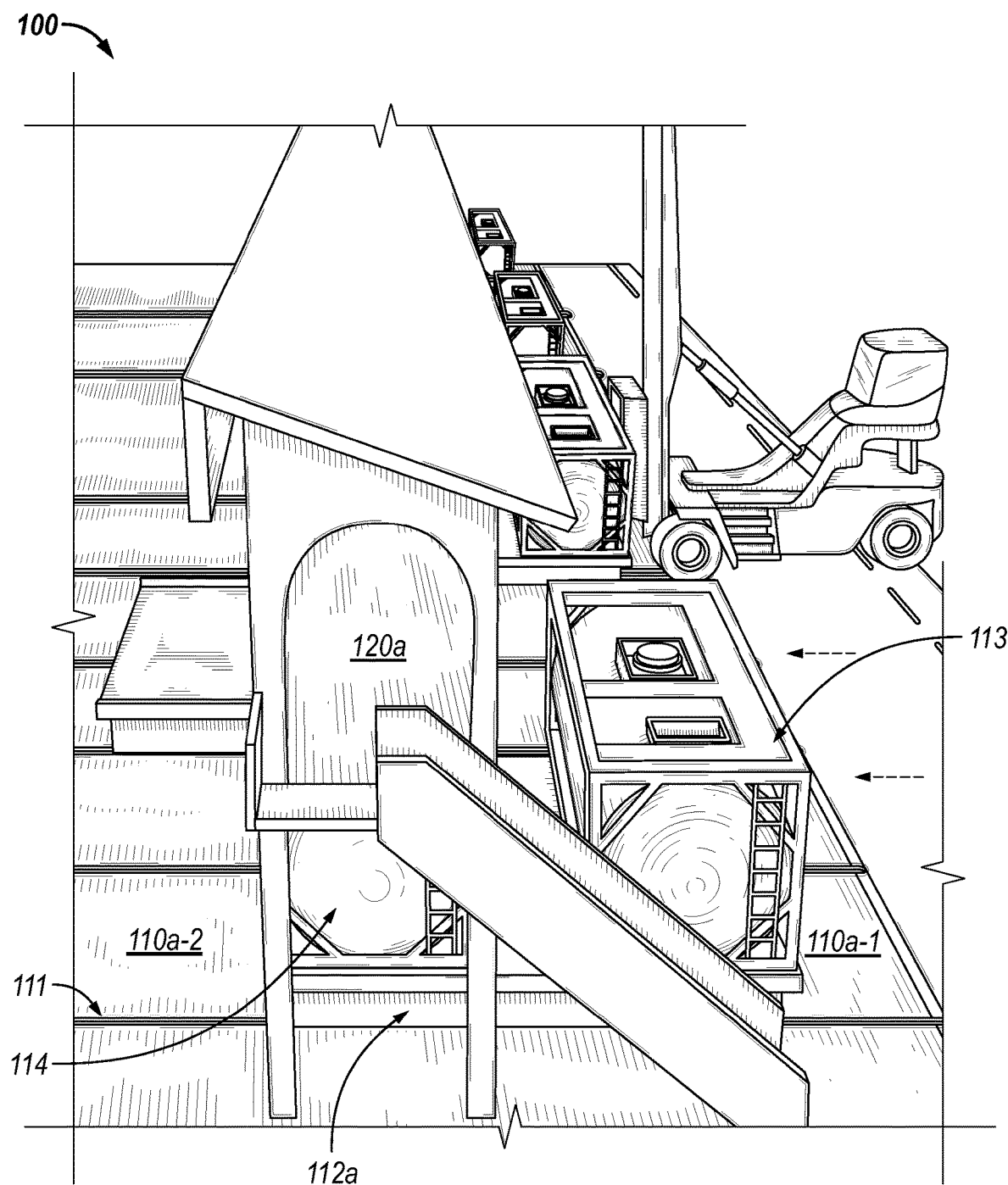
FIG. 5 shows another side view of the station system according to an exemplary embodiment of the present disclosure.

FIG. 5 shows another side view of the station system 100 according to an exemplary embodiment of the present disclosure. In this example, the technician has activated the control unit to move the trolley 112(a) from the second mode of operation (i.e., a portion of the trolley 112(a) is in the lifting bay 110(a)(2)) to the first mode of operation (i.e., a portion of the trolley 112(a) is in the lifting bay 110(a)(1)). As a result, the technician can now work on the container 114 and the lift truck 115 can replace the container 113, which may have been serviced already. Because the container 114 is available to the technician, the technician does not need to wait for the lift truck 115 to replace the container 113. Instead, the technician can start working on container 114 even though the container 113 has not been hauled away.

Figure 6:
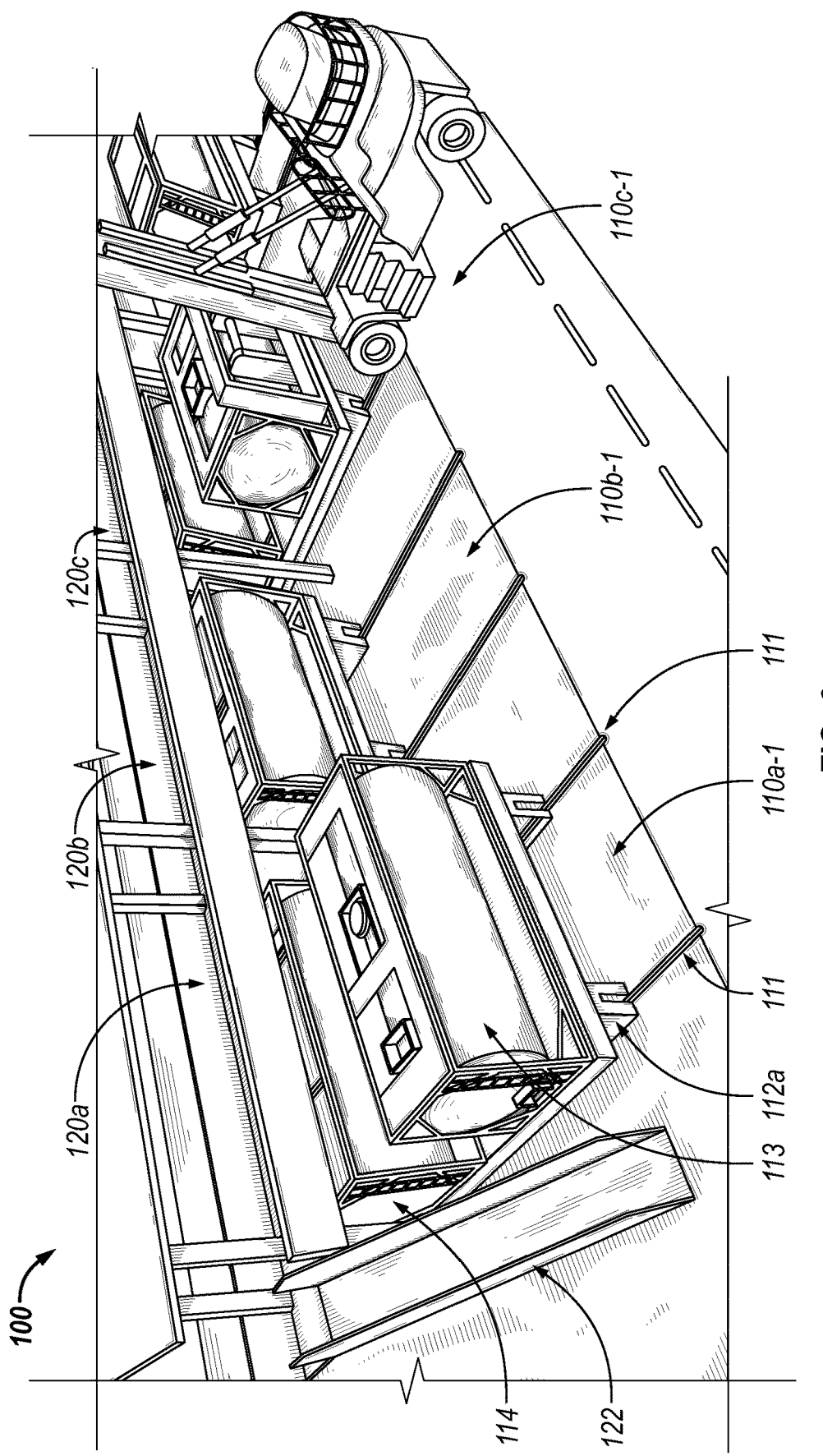
FIG. 6 shows a front perspective view of the station system according to an exemplary embodiment of the present disclosure.
Figure 7:
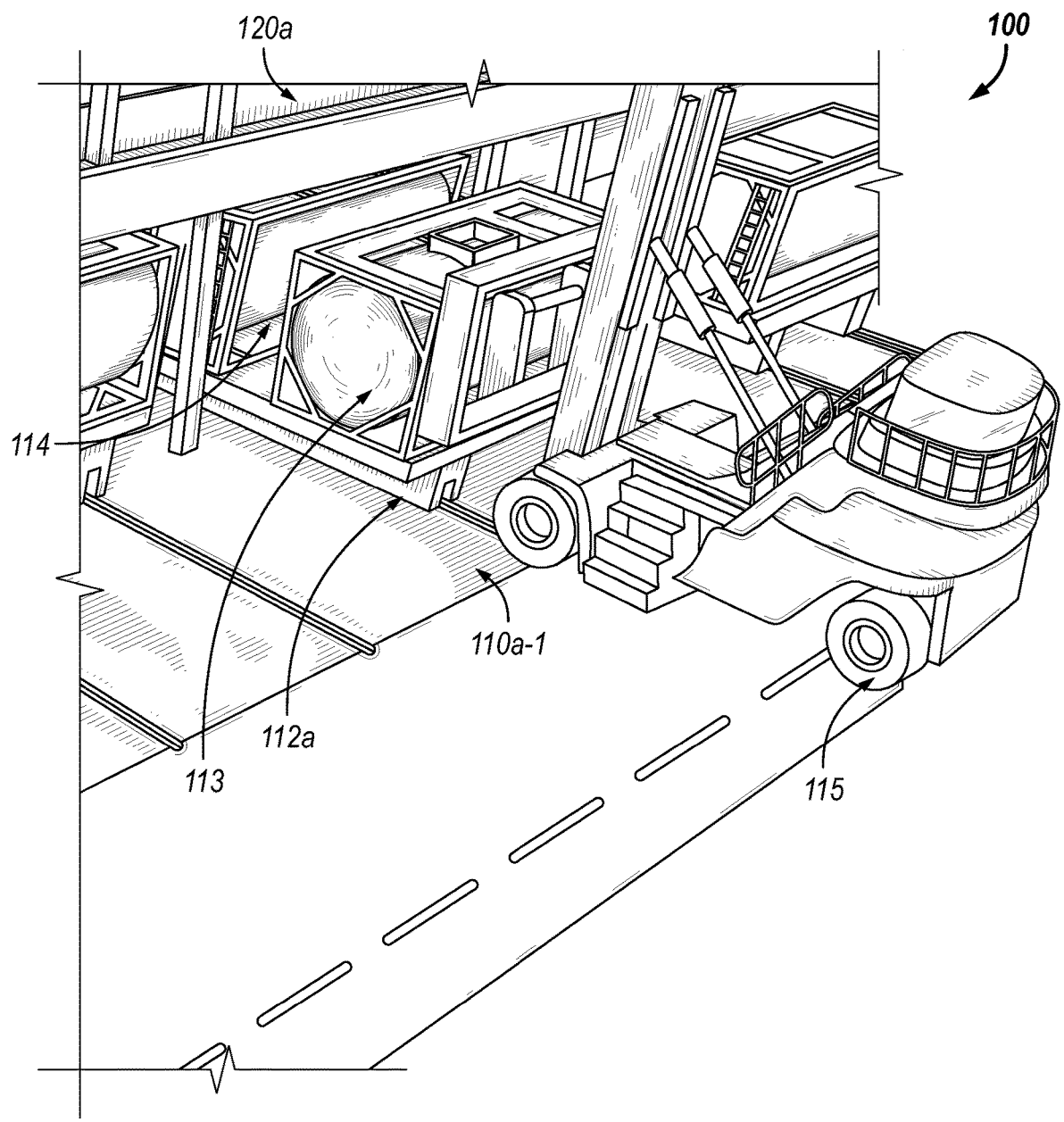
FIG. 7 shows another front perspective view of the station system according to an exemplary embodiment of the present disclosure.
Figure 8:
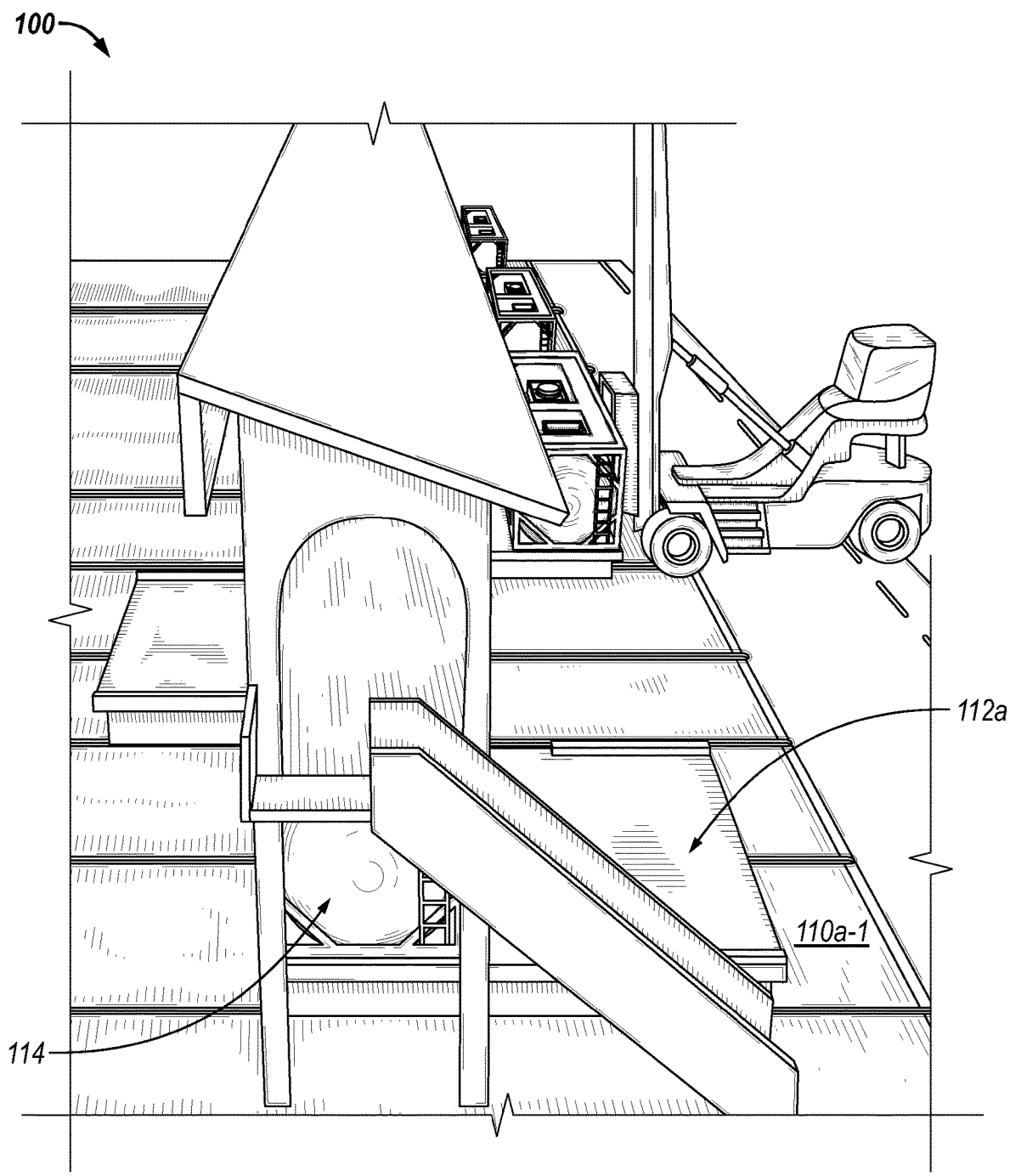
FIG. 8 shows yet another side view of the station system according to an exemplary embodiment of the present disclosure.

FIG. 6 shows a front perspective view of the station system 100 according to an exemplary embodiment of the present disclosure. In this example embodiment, the trolley 112(a) in the first mode of operation and the container 113 can be taken away by the lift truck 115. FIG. 6 also shows the tracks on which the trolley 112(a) can move between the lifting bays 110(a)(1) and 110(a)(2). FIG. 7 shows another front perspective view of the station system 100 according to an exemplary embodiment of the present disclosure. In this example, the lift truck 115 is lifting the container 113 to take it away. FIG. 8 shows yet another side view of the station system 100 according to an exemplary embodiment of the present disclosure. In this example, the container 113 has been hauled away by the lift truck 115. The trolley 112(a) is in the first mode of operation and is ready to receive a new container. The technician is able to service container 114, which is under the service bay 120(a).

Figure 9:
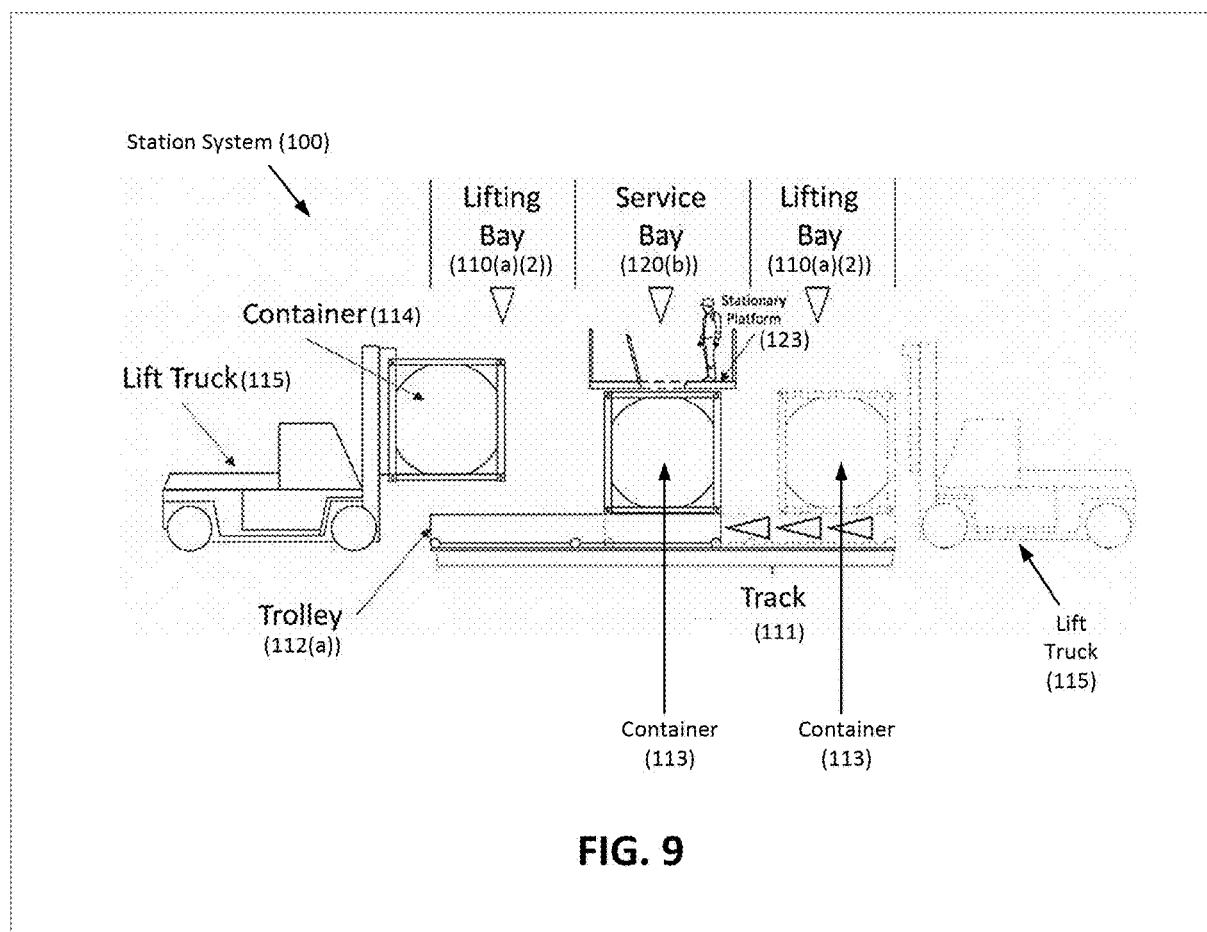
FIG. 9 shows a schematic of the side view of the station system according to an exemplary embodiment of the present disclosure.
Figure 10:
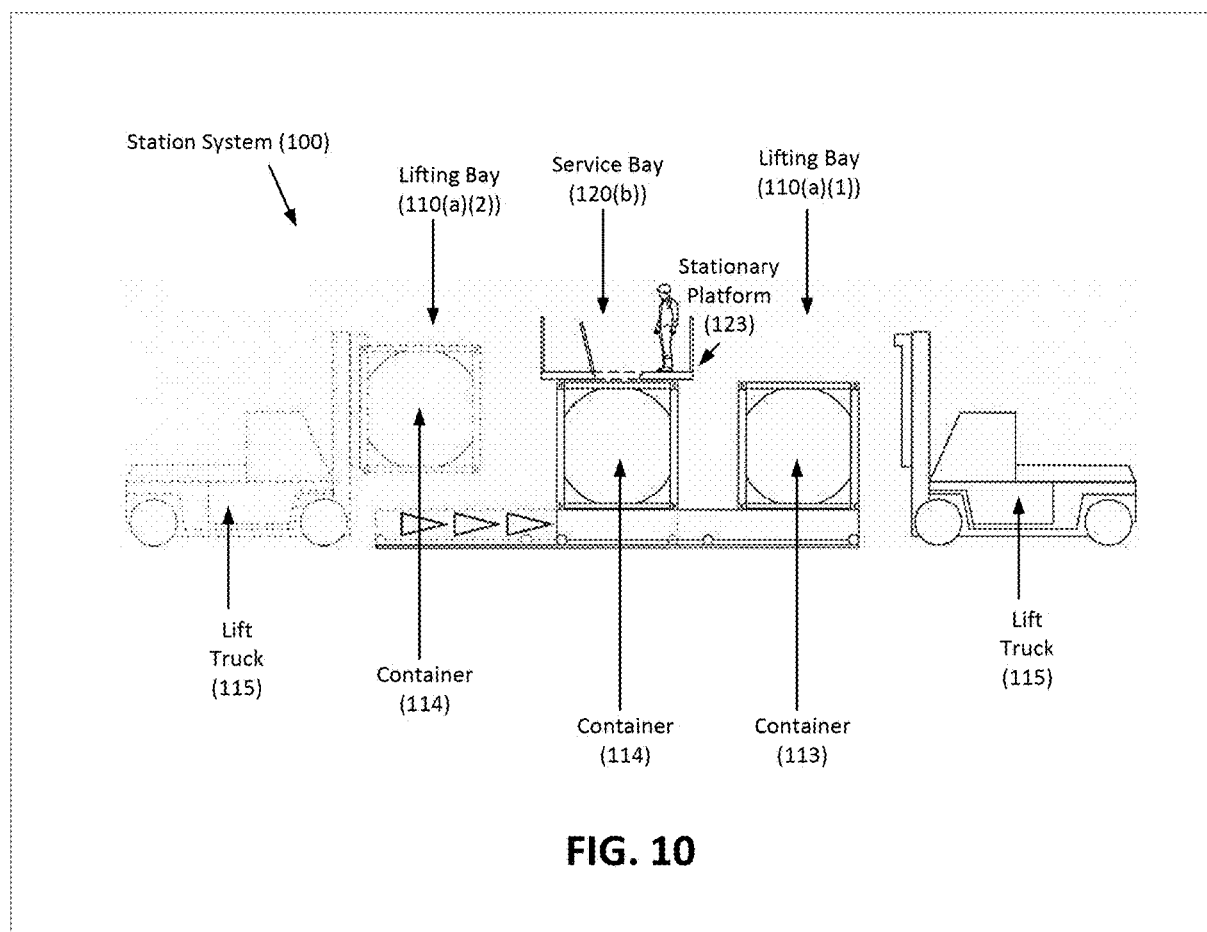
FIG. 10 shows another schematic of the side view of the station system according to an exemplary embodiment of the present disclosure.

FIG. 9 shows a schematic of the side view of the station system 100 according to an exemplary embodiment of the present disclosure. In this exemplary schematic, the technician can be on the stationary platform 123, working on the container 113 in the service bay 120(b). The lift truck 115 can place the container 114 on the trolley 112(a). The trolley 112(a) can be in the second mode of operation. After finishing the work on the container 113, the technician can activate the control unit to move the trolley 112(a) to the first mode of operation. FIG. 10 shows another schematic of the side view of the station system 100 according to an exemplary embodiment of the present disclosure. In this example, the trolley 112(a) has moved to the first mode of operation and the container 114 is accessible to technician for service. The trolley 112(a) has moved the container 113 to the lifting bay 110(a)(1). The lift truck 115 can now remove the container 113, which has already been serviced by the technician.

Figure 11:
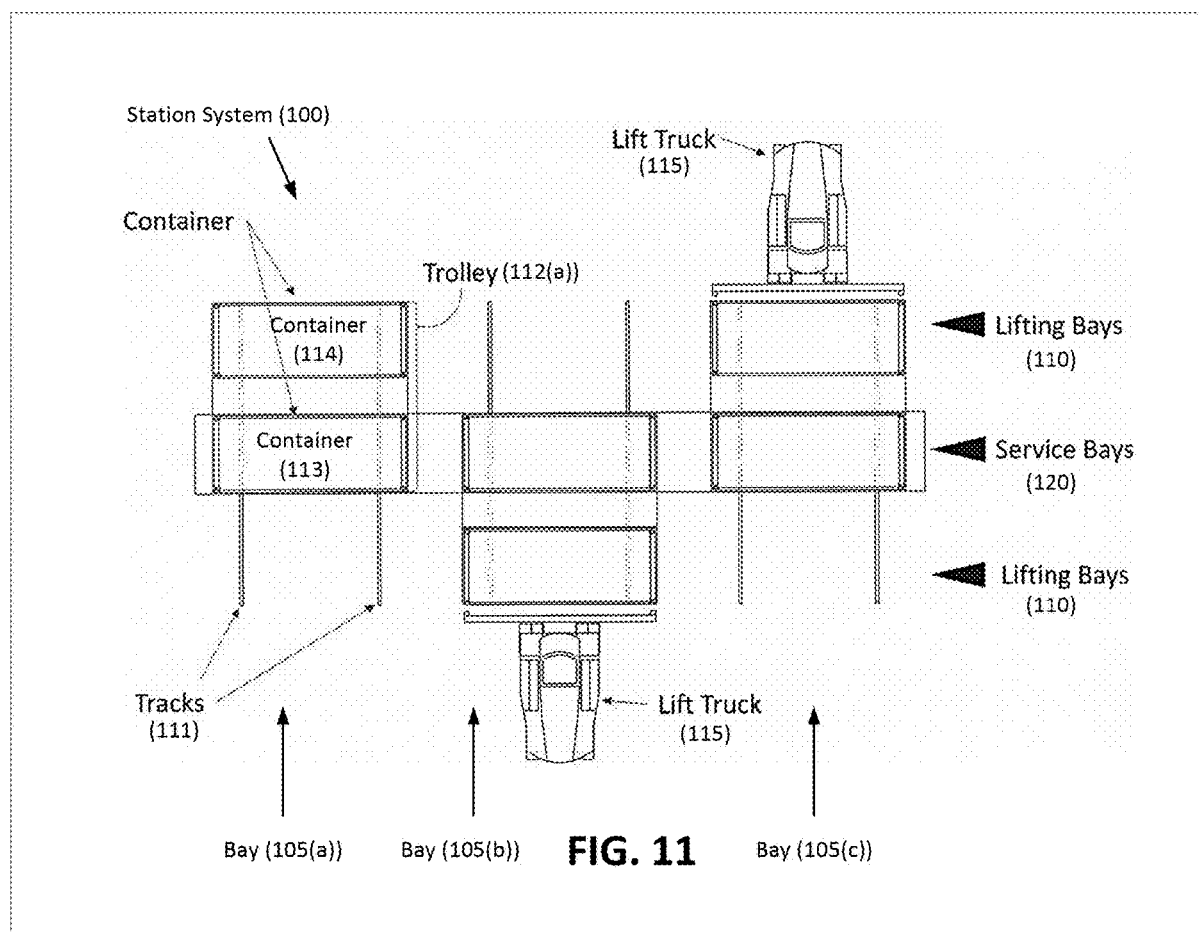
FIG. 11 shows a schematic of the top view of the station system according to an exemplary embodiment of the present disclosure.

FIG. 11 shows a schematic of the top view of the station system 100 according to an exemplary embodiment of the present disclosure. FIG. 11 shows bays 105(a), 105(b) and 105(c) for the station system 100. In this example, each bay can include a trolley 112, and each trolley can hold two containers, e.g., containers 113 and 114. Upon an instruction from the control unit, one or more of the trolleys 112 can be moved between the first and second modes of operation for each trolley, and provide access to the containers in the service bays 120, respectively.

Features of the Control Unit

In one example embodiment, a control unit can include a machine learning model. In this example, the control unit can receive data, and based on the data, can make predictions about the operation of the station system. For example, the data can include the services performed on the containers, past performance of the technicians working on the containers (e.g., the time it took to perform a specific task), the size of the containers, the type of containers, the number of containers received on a given day, the calendar day on which the containers were serviced, the provider of the containers, the weather and temperature when the containers were serviced, the parts used to service the containers, the cost for servicing the containers, the type of access that was required by the containers, etc. The control unit can use a machine learning model, using the data, to predict how long it takes to service a particular container, and therefore, predict when and how often the containers should be changed at a given bay (or service bay). As another example, the machine learning model can predict the parts that should be ordered for the container depot. As yet another example, the machine learning model can predict the cost for finishing service on a particular number of containers. As yet another example, the machine learning model can predict an optimal number of lift trucks and/or operators for the lift trucks for a given day or number of containers to be serviced.

In one example embodiment, the machine learning model can predict one or more service bays which are going to finish their current work on the containers before the other service bays. This prediction can be based on, e.g., the type of service required to be provided to the container, a work history of the technician working on the container, prior cargo shipped by the container, the model and build of the container, etc. The control unit can receive some of this information from a central repository. The control unit can also receive some of this information from the technician. This prediction can also be based on sensor data received from the service bays, e.g., sensor data indicating that the technician closed a particular door of the container, that the technician got out of the container, a weight or weight change of the container, or that the technician has not worked on the container in excess of a threshold time. The machine learning model can determine a prioritized list of service bays for receiving containers. Subsequently, the control unit can transmit the list to one or more of the operators of the lift trucks. For example, the control unit can assign one or more of the operators to remove containers from lifting bays associated with the service bays, and replace them with other containers, respectively.

Technical Implementation of the Control Unit

Figure 12:
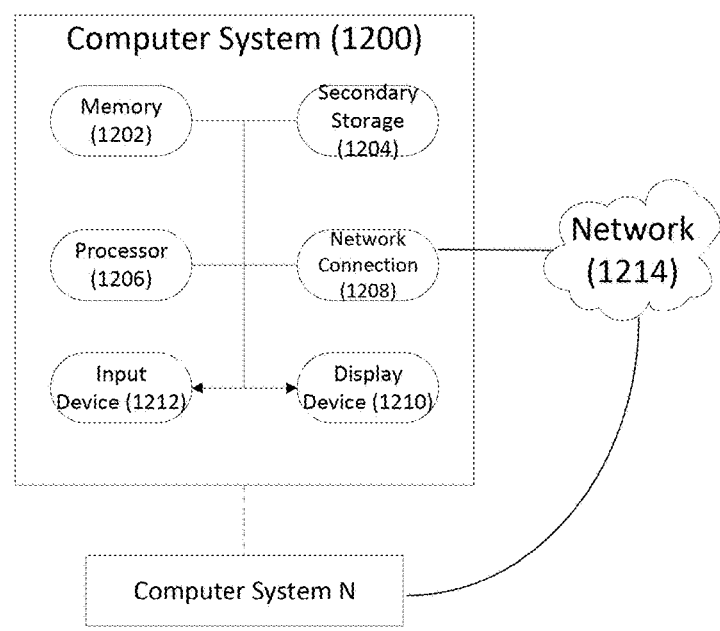
FIG. 12 illustrates exemplary hardware components for a control unit.

FIG. 12 illustrates exemplary hardware components of a control unit (or computer system). A computer system 1200, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 1200, may run an application (or software) and perform the steps and functionalities described above. Computer system 1200 may connect to a network 1214, e.g., Internet, or other network, to receive inquiries, obtain data, and transmit information and incentives as described above.

The computer system 1200 typically includes a memory 1202, a secondary storage device 1204, and a processor 1206. The computer system 1200 may also include a plurality of processors 1206 and be configured as a plurality of, e.g., bladed servers, or other known server configurations. The computer system 1200 may also include a network connection device 1208, a display device 1210, and an input device 1212.

The memory 1202 may include RAM or similar types of memory, and it may store one or more applications for execution by processor 1206. Secondary storage device 1204 may include a hard disk drive, floppy disk drive, CD-ROM drive, or other types of non-volatile data storage. Processor 1206 executes the application(s), such as those described herein, which are stored in memory 1202 or secondary storage 1204, or received from the Internet or other network 1214. The processing by processor 1206 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 1200 may store one or more database structures in the secondary storage 1204, for example, for storing and maintaining the information necessary to perform the above-described functions. Alternatively, such information may be in storage devices separate from these components.

Also, as noted, processor 1206 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 1200.

The input device 1212 may include any device for entering information into the computer system 1200, such as a touch-screen, keyboard, mouse, cursor-control device, microphone, digital camera, video recorder or camcorder. The input and output device 1212 may be used to enter information into GUIs during performance of the methods described above. The display device 1210 may include any type of device for presenting visual information such as, for example, a computer monitor or flat-screen display (or mobile device screen). The display device 1210 may display the GUIs and/or output from sub-system components (or software).

Examples of the computer system 1200 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1200 is shown in detail, system 1200 may use multiple computer systems or servers as necessary or desired to support the users and may also use back-up or redundant servers to prevent network downtime in the event of a failure of a particular server. In addition, although computer system 1200 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1200, to perform a particular method, such as methods described above.

Embodiments

A system comprising:

a station comprising a service bay, a first lifting bay, and a second lifting bay;

a set of tracks connecting the first lifting bay to the service bay and the second lifting bay;

a trolley configured to slide on the set of tracks and receive a first container and a second container; and a control unit for activating a motor of the trolley;

wherein in a first mode of operation, the trolley is configured to be in the service bay and the first lifting bay, and in a second mode of operation, the trolley is configured to be in the service bay and the second lifting bay.

The system of any one or more prior embodiments, wherein the service bay includes a stationary platform.

The system of any one or more prior embodiments, wherein in the first mode of operation, the first container is under the service bay, and in the second mode of operation, the second container is under the service bay.

The system of any one or more prior embodiments, wherein in the first mode of operation, the first container is accessible through the stationary platform, and in the second mode of operation, the second container accessible through the stationary platform.

The system of any one or more prior embodiments, wherein the service bay includes an access ramp and a roof.

The system of any one or more prior embodiments, wherein a side of the trolley is about twice a width of the service bay and wherein a length of the set of tracks is about three times a width of the service bay.

The system of any one or more prior embodiments, wherein the control unit is configured to receive data from a sensor, and activate the motor for the trolley using the data.

The system of any one or more prior embodiments, wherein the data includes a weight or a weight change of a container under service.

The system of any one or more prior embodiments, wherein the data includes a signal indicating that a door of a container has been closed.

The system of any one or more prior embodiments, wherein the data includes a signal indicating that a technician has not worked on a container for more than a threshold time.

The system of any one or more prior embodiments, wherein the control unit is configured to run a machine learning model.

The system of any one or more prior embodiments, wherein the machine learning model is trained using data including past performance of a technician.

The system of any one or more prior embodiments, wherein the machine learning model is configured to predict when a service being performed on at least one of the first container and the second container is going to conclude.

The system of any one or more prior embodiments, wherein the machine learning model is configured to contact a lift truck for delivering a container to the trolley.

The system of any one or more prior embodiments, wherein the machine learning model is configured to contact a lift truck for removing at least one of a first container and the second container from the trolley.

The system of any one or more prior embodiments, wherein at least one of the first container and the second container is an intermodal container, a tank, or a combination thereof.

The system of any one or more prior embodiments, wherein a lift truck is configured to place or remove at least one of the first container and the second container on the trolley.

A method for facilitating container movement within a system comprising:
employing one or more trolleys to facilitate movement of two or more containers wherein the one or more trolleys is configured to slide on a set of tracks between a lifting bay and service bay; and
configuring the system such that a first of the two or more containers is subjected to a service step while a second of the two or more containers is subjected to a movement step.

The method of any one or more prior embodiments wherein the service step comprises cleaning.

The method of any one or more prior embodiments wherein the tracks comprise one or more rails.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A system comprising:
a station comprising a service bay, a first lifting bay, and a second lifting bay;
a set of tracks connecting the first lifting bay to the service bay and the second lifting bay;
a trolley configured to slide on the set of tracks and receive a first container and a second container; and
a control unit for activating a motor of the trolley;
wherein in a first mode of operation, the trolley is configured to be in the service bay and the first lifting bay, and in a second mode of operation, the trolley is configured to be in the service bay and the second lifting bay; and wherein:
(1) the service bay includes an access ramp and a roof; or
(2) a side of the trolley is about twice a width of the service bay and wherein a length of the set of tracks is about three times a width of the service bay; or
(3) both (1) and (2).

2. The system of claim 1, wherein the service bay includes a stationary platform.

3. The system of claim 1, wherein in the first mode of operation, the first container is under the service bay, and in the second mode of operation, the second container is under the service bay.

4. The system of claim 2, wherein in the first mode of operation, the first container is accessible through the stationary platform, and in the second mode of operation, the second container accessible through the stationary platform.

5. A system comprising:
a station comprising a service bay, a first lifting bay, and a second lifting bay;
a set of tracks connecting the first lifting bay to the service bay and the second lifting bay;
a trolley configured to slide on the set of tracks and receive a first container and a second container; and
a control unit for activating a motor of the trolley;
wherein in a first mode of operation, the trolley is configured to be in the service bay and the first lifting bay, and in a second mode of operation, the trolley is configured to be in the service bay and the second lifting bay;
wherein the control unit is configured to receive data from a sensor, and activate the motor for the trolley using the data; and wherein:
(1) the data includes a weight or a weight change of a container under service; or
(2) the data includes a signal indicating that a door of a container has been closed; or
(3) the data includes a signal indicating that a technician has not worked on a container for more than a threshold time; or
(4) any combination of (1), (2), and (3).

6. A system comprising:
a station comprising a service bay, a first lifting bay, and a second lifting bay;
a set of tracks connecting the first lifting bay to the service bay and the second lifting bay;
a trolley configured to slide on the set of tracks and receive a first container and a second container; and
a control unit for activating a motor of the trolley;
wherein in a first mode of operation, the trolley is configured to be in the service bay and the first lifting bay, and in a second mode of operation, the trolley is configured to be in the service bay and the second lifting bay;
wherein the control unit is configured to run a machine learning model.

7. The system of claim 6, wherein the machine learning model is trained using data including past performance of a technician.

8. The system of claim 6, wherein the machine learning model is configured to predict when a service being performed on at least one of the first container and the second container is going to conclude.

9. The system of claim 8, wherein the machine learning model is configured to contact a lift truck for delivering a container to the trolley.

10. The system of claim 8, wherein the machine learning model is configured to contact a lift truck for removing at least one of a first container and the second container from the trolley.

11. A system comprising:
- a station comprising a service bay, a first lifting bay, and a second lifting bay;
- a set of tracks connecting the first lifting bay to the service bay and the second lifting bay;
- a trolley configured to slide on the set of tracks and receive a first container and a second container; and
- a control unit for activating a motor of the trolley;
- wherein in a first mode of operation, the trolley is configured to be in the service bay and the first lifting bay, and in a second mode of operation, the trolley is configured to be in the service bay and the second lifting bay; wherein:
  - (1) wherein at least one of the first container and the second container is an intermodal container, a tank, or a combination thereof, or
  - (2) a lift truck is configured to place or remove at least one of the first container and the second container on the trolley; or
  - (3) both (1) and (2).

12. A method for facilitating container movement within a system comprising:
- employing one or more trolleys to facilitate movement of two or more containers wherein the one or more trolleys is configured to slide on a set of tracks between a lifting bay and service bay; and
- configuring the system such that a first of the two or more containers is subjected to a service step while a second of the two or more containers is subjected to a movement step;
- wherein at least one of the first container and the second container is an intermodal container, a tank, or a combination thereof.

13. The method of claim 12 wherein the service step comprises cleaning.

14. The method of claim 12 wherein the tracks comprise one or more rails.

\* \* \* \* \*